US008386239B2

(12) United States Patent
Connor

(10) Patent No.: US 8,386,239 B2
(45) Date of Patent: Feb. 26, 2013

(54) MULTI-STAGE TEXT MORPHING

(75) Inventor: Robert A. Connor, Minneapolis, MN (US)

(73) Assignee: Holovisions LLC, Forest Lake, MN (US)

( * ) Notice: Subject to any disclaimer, the term of this patent is extended or adjusted under 35 U.S.C. 154(b) by 448 days.

(21) Appl. No.: 12/802,930

(22) Filed: Jun. 17, 2010

(65) Prior Publication Data
US 2011/0184725 A1 Jul. 28, 2011

Related U.S. Application Data

(60) Provisional application No. 61/336,757, filed on Jan. 25, 2010, provisional application No. 61/336,758, filed on Jan. 25, 2010, provisional application No. 61/336,759, filed on Jan. 25, 2010.

(51) Int. Cl.
G06F 17/27 (2006.01)
(52) U.S. Cl. .......................................................... 704/9
(58) Field of Classification Search ....................... 704/9
See application file for complete search history.

(56) References Cited

U.S. PATENT DOCUMENTS

| | | | |
|---|---|---|---|
| 4,456,973 A | 6/1984 | Carlgren et al. | |
| 4,641,264 A * | 2/1987 | Nitta et al. | 704/4 |
| 4,773,039 A | 9/1988 | Zamora | |
| 5,210,473 A * | 5/1993 | Backstrand | 318/99 |
| 5,265,065 A * | 11/1993 | Turtle | 1/1 |
| 5,584,024 A * | 12/1996 | Shwartz | 1/1 |
| 5,708,825 A | 1/1998 | Sotomayor | |
| 5,717,913 A | 2/1998 | Driscoll | |
| 5,742,834 A * | 4/1998 | Kobayashi | 704/10 |
| 5,953,718 A | 9/1999 | Wical | |
| 6,269,368 B1 | 7/2001 | Diamond | |
| 6,289,337 B1 | 9/2001 | Davies et al. | |
| 6,389,409 B1 | 5/2002 | Horovitz et al. | |
| 6,424,358 B1 * | 7/2002 | DiDomizio et al. | 715/762 |
| 6,523,028 B1 * | 2/2003 | DiDomizio et al. | 707/748 |
| 6,542,889 B1 | 4/2003 | Aggarwal et al. | |
| 6,632,251 B1 | 10/2003 | Rutten et al. | |
| 6,757,692 B1 | 6/2004 | Davis et al. | |
| 6,847,966 B1 | 1/2005 | Sommer et al. | |
| 6,865,572 B2 | 3/2005 | Boguraev et al. | |
| 6,970,859 B1 | 11/2005 | Brechner et al. | |
| 7,003,516 B2 | 2/2006 | Dehlinger et al. | |
| 7,062,487 B1 | 6/2006 | Nagaishi et al. | |
| 7,113,943 B2 | 9/2006 | Bradford et al. | |
| 7,124,362 B2 | 10/2006 | Tischer | |
| 7,167,824 B2 | 1/2007 | Kallulli | |
| 7,231,379 B2 | 6/2007 | Parikh et al. | |
| 7,231,393 B1 | 6/2007 | Harik et al. | |
| 7,260,567 B2 | 8/2007 | Parikh et al. | |
| 7,292,972 B2 | 11/2007 | Lin et al. | |
| 7,296,009 B1 | 11/2007 | Jiang et al. | |
| 7,366,711 B1 | 4/2008 | McKeown et al. | |
| 7,370,056 B2 | 5/2008 | Parikh et al. | |
| 7,401,077 B2 | 7/2008 | Bobrow et al. | |
| 7,472,343 B2 | 12/2008 | Vasey | |
| 7,480,642 B2 | 1/2009 | Koono et al. | |
| 7,496,621 B2 | 2/2009 | Pan et al. | |
| 7,499,934 B2 | 3/2009 | Zhang et al. | |

(Continued)

*Primary Examiner* — Eric Yen

(57) ABSTRACT

This invention is a multi-stage method for "text morphing," wherein text morphing involves integrating or blending together substantive content from two or more bodies of text into a single body of text based on locations of linguistic commonality among the two or more bodies of text. This method for multi-stage text morphing entails: substitution of phrase synonyms between two bodies of text; substitution, between two bodies of text, of text segments with synonymous starting phrases and synonymous ending phrases; and substitution, between two bodies of text, of phrases or segments using associations within a larger reference body of text. Text morphing as disclosed herein can be useful for creative ideation, product development, integrative search engines, and entertainment purposes.

18 Claims, 6 Drawing Sheets

U.S. PATENT DOCUMENTS

| | | |
|---|---|---|
| 7,548,913 B2 | 6/2009 | Ekberg et al. |
| 7,567,976 B1 | 7/2009 | Betz et al. |
| 7,580,921 B2 | 8/2009 | Patterson |
| 7,580,929 B2 | 8/2009 | Patterson |
| 7,584,175 B2 | 9/2009 | Patterson |
| 7,587,309 B1 | 9/2009 | Rohrs et al. |
| 7,587,387 B2 | 9/2009 | Hogue |
| 7,599,899 B2 | 10/2009 | Rehberg et al. |
| 7,627,562 B2 | 12/2009 | Kacmarcik et al. |
| 7,627,809 B2 | 12/2009 | Balinsky |
| 7,630,980 B2 | 12/2009 | Parikh |
| 7,636,714 B1 * | 12/2009 | Lamping et al. ............. 1/1 |
| 7,640,158 B2 | 12/2009 | Detlef et al. |
| 7,689,899 B2 | 3/2010 | Leymaster et al. |
| 7,721,201 B2 | 5/2010 | Grigoriadis et al. |
| 2006/0253431 A1 | 11/2006 | Bobick et al. |
| 2007/0100823 A1 | 5/2007 | Inmon |
| 2008/0319962 A1 * | 12/2008 | Riezler et al. ............. 707/4 |
| 2009/0018990 A1 | 1/2009 | Moraleda |
| 2009/0024606 A1 | 1/2009 | Schilit et al. |
| 2009/0055394 A1 | 2/2009 | Schilit et al. |
| 2009/0083027 A1 | 3/2009 | Hollingsworth |
| 2009/0094137 A1 | 4/2009 | Toppenberg et al. |
| 2009/0193011 A1 | 7/2009 | Blair-Goldensohn et al. |
| 2009/0216738 A1 | 8/2009 | Dexter et al. |
| 2009/0216764 A1 | 8/2009 | Dexter |
| 2009/0217159 A1 | 8/2009 | Dexter et al. |
| 2009/0217168 A1 | 8/2009 | Dexter et al. |
| 2009/0292719 A1 | 11/2009 | Lachtarnik et al. |
| 2009/0313233 A1 | 12/2009 | Hanazawa |
| 2009/0313243 A1 | 12/2009 | Buitelaar et al. |
| 2010/0036838 A1 | 2/2010 | Ellis |
| 2010/0070448 A1 | 3/2010 | Omoigui |

* cited by examiner

Key:
P means "phrase"
~ means "identical or synonyms"
△ means "substitution"

Key:
P means "phrase"
~ means "identical or synonyms"
△ means "substitution"

Key:
P means "phrase"
~ means "identical or synonyms"
△ means "substitution"

Key:

P means "phrase"
~ means "identical or synonyms"
△ means "substitution"

Key:
P means "phrase"
~ means "identical or synonyms"
△ means "substitution"

US 8,386,239 B2

MULTI-STAGE TEXT MORPHING

CROSS-REFERENCE TO RELATED APPLICATIONS

This patent application claims the priority benefits of: U.S. Provisional Patent Application 61/336757 entitled "Morphing Text Style" filed on Jan. 25, 2010 by Robert A. Connor; U.S. Provisional Patent Application 61/336758 entitled "Morphing Text by Splicing End-Compatible Segments" filed on Jan. 25, 2010 by Robert A. Connor; and U.S. Provisional Patent Application 61/336759 entitled "Multi-Stage Text Morphing" filed on Jan. 25, 2010 by Robert A. Connor.

FEDERALLY SPONSORED RESEARCH

Not Applicable

SEQUENCE LISTING OR PROGRAM

Not Applicable

FIELD OF INVENTION

This invention relates to word processing, text processing, and information search.

Introduction to Text Morphing

The term "text morphing," as used herein, is the integration or blending together of substantive content from two or more bodies of text into a single body of text based on locations of linguistic commonality among the two or more bodies of text. In some respects, this "text morphing" may be viewed as the text-based version of "image morphing" in which two or more images are integrated or blended together based on locations of image subject commonality among the two or more images. The meaning of the term "text morphing" as used herein is different from its occasional use in the prior art in reference to incremental video-graphic transition of text letters from one word (or phrase) to another word (or phrase).

The method of text morphing that is disclosed has several useful applications. For example, text morphing can synthesize novel concepts and expressions that, when interacted with human imagination, can create useful ideas, creative works, and products. Sometimes a stroke of genius comes from combining diverse concepts in a way that no one has done before and sometimes these combinations are serendipitous. An author or inventor who is uninspired when staring at blank page or computer screen (as in "writer's block") may be inspired to creative achievement by reading a text-morphed composition. As another application, text morphing may prove useful in the next generation of search methods. A search method that integrates and synthesizes information across multiple sources can provide more useful search results than a search method that is just limited to separate ranking and listing of individual sources. Also, as is the case with image morphing, text morphing may serve the purpose of entertaining and amusing people.

Review and Limitations of the Prior Art

There are many interesting methods in the prior art for processing text from single and multiple text-based sources. However, none of these methods disclose morphing together substantive content from two or more text-based sources as is done by the invention that is disclosed herein. As an organizing construct for this review, text-processing methods may be classified into four general categories: (1) methods to create a summary of a single source; (2) methods to modify a single document by phrase substitution; (3) methods to combine content from multiple sources using templates; and (4) methods to combine content from multiple sources without templates. We now discuss these general method categories, including their limitations and some examples thereof.

1. Methods to Create a Summary of a Single Source

There are methods in the prior art to create a summary (or an abstract or targeted excerpt) of a single text-based source. These methods can also be applied to multiple text-based sources to create a separate summary for each of several sources. Such methods are useful for a variety of applications, including creating document summaries for research review purposes or for display of search engine results. However, such methods do not morph together content between two or more text-based sources. Examples in the prior art that appear to use such document-summarizing methods include the following U.S. Pat. Nos.: 6,865,572 (Boguraev et al., 2005; "Dynamically Delivering, Displaying Document Content as Encapsulated Within Plurality of Capsule Overviews with Topic Stamp"); 7,292,972 (Lin et al., 2007; "System and Method for Combining Text Summarization"); and 7,587,309 (Rohrs et al., 2009; "System and Method for Providing Text Summarization for Use in Web-Based Content").

2. Methods to Modify a Single Document by Phrase Substitution

There are methods in the prior art to modify a single document by selectively substituting alternative phrases (single words or multiple word combinations) for the phrases that were originally used in the document. For example, the alternative phrases may be similar in meaning, but different in style or complexity, as compared to the original phrases used in the document. Such methods are useful for a variety of applications, including rewriting documents for different audiences or purposes. However, such methods do not morph together substantive content between two or more text-based sources.

Examples in the prior art that appear to use phrase substitution methods include the following U.S. Pat. Nos.: 4,456,973 (Carlgren et al., 1984; "Automatic Text Grade Level Analyzer for a Text Processing System"); 4,773,039 (Zamora, 1988; "Information Processing System for Compaction and Replacement of Phrases"); 7,113,943 (Bradford et al., 2006; "Method for Document Comparison and Selection"); 7,472,343 (Vasey, 2008; "Systems, Methods and Computer Programs for Analysis, Clarification, Reporting on and Generation of Master Documents for Use in Automated Document Generation"); 7,599,899 (Rehberg et al., 2009; "Report Construction Method Applying Writing Style and Prose Style to Information of User Interest"); 7,627,562 (Kacmarcik et al., 2009; "Obfuscating Document Stylometry"); and 7,640,158 (Detlef et al., 2009; "Automatic Detection and Application of Editing Patterns in Draft Documents"). Such examples also appear to include U.S. patent applications: 20070100823 (Inmon, 2007; "Techniques for Manipulating Unstructured Data Using Synonyms and Alternate Spellings Prior to Recasting as Structured Data"); 20090094137 (Toppenberg et al., 2009; "Web Page Optimization Systems"); 20090217159 (Dexter et al., 2009; "Systems and Methods of Performing a Text Replacement Within Multiple Documents"); and 20090313233 (Hanazawa, 2009; "Inspiration Support Apparatus Inspiration Support Method and Inspiration Support Program").

3. Methods to Combine Content from Multiple Sources using Templates

There are methods in the prior art that use templates to combine content from multiple text-based sources into a single standard-format report or some other standardized document. For example, a standardized sales report may be created by extracting sales information from multiple sources to "fill in the blanks" of a template for a standardized sales report. There are many useful applications for such methods, but they are limited to the particular subject domains for which templates are created. They do not provide a generalizable, flexible method for morphing together content between two or more text-based sources across a wide variety of subject domains and applications. Examples in the prior art that appear to use templates to combine content from multiple text-based sources include: U.S. Pat. Nos. 7,627,809 (Balinsky, 2009; "Document Creation System and Related Methods"), 7,689,899 (Leymaster et al., 2010; "Methods and Systems for Generating Documents"), and 7,721,201 (Grigoriadis et al., 2010; "Automatic Authoring and Publishing System"); as well as U.S. patent application 20100070448 (Omoigui, 2010; "System and Method for Knowledge Retrieval, Management, Delivery and Presentation").

4. Methods to Combine Content from Multiple Sources without Templates

There are methods in the prior art that combine, to some extent, content from multiple text-based sources in some fashion without using a template. U.S Pat. No. 5,953,718 (Wical, 1999; "Research Mode for a Knowledge Base Search and Retrieval System") uses point of view "gists" from different documents to create a synopsis. U.S Pat. No. 6,847,966 (Sommer et al., 2005; "Method and System for Optimally Searching a Document Database Using a Representative Semantic Space") uses "pseudo-document vectors" to represent hypothetical documents. U.S. Pat. No. 7,366,711 (McKeown et al., 2008; "Multi-Document Summarization System and Method") performs temporal processing on phrases from different documents in order to generate a summary. U.S. Pat. No. 7,548,913 (Ekberg et al., 2009; "Information Synthesis Engine") organizes excerpts from, and hyperlinks to, different documents. U.S. Patent Application 20090193011 (Blair-Goldensohn et al., 2009; "Phrase Based Snippet Generation") generates a snippet with a plurality of sentiments about an entity from different review sources. U.S. Patent Application 20090292719 (Lachtarnik et al., 2009; "Methods for Automatically Generating Natural-Language News Items from Log Files and Status Traces") automatically generates natural-language news items from log files. These are interesting and useful methods. However, none of these methods flexibly morphs together the substantive content of two or more text-based sources as does the invention that we will now disclose herein.

SUMMARY OF THE INVENTION

This invention is a multi-stage method for "text morphing," wherein text morphing involves integrating or blending together substantive content from two or more bodies of text into a single body of text based on locations of linguistic commonality among the two or more bodies of text. This method for multi-stage text morphing spans four stages of text morphing. First-stage text morphing is substitution of phrase synonyms between two bodies of text. This changes text style, but does not significantly change text meaning. Second-stage text morphing is substitution, between two bodies of text, of text segments with synonymous starting phrases and synonymous ending phrases.

This second stage is analogous, in some respects, to splicing different gene segments that have compatible starting and ending sequences, but different middle sequences. This begins to morph meaning in addition to style. The third and fourth stages of text morphing involve substitution, between two bodies of text, of phrases or segments using associations within a larger reference body of text. These latter stages substantially morph together the content of two or more bodies of text.

DESCRIPTION OF THE FIGURES

These figures show different examples of how this invention may be embodied.

However, these examples are not exhaustive and these figures do not limit the full generalizability of the claims.

FIGS. 1 and 2 show rounded rectangles that represent two bodies of text: Text A (labeled 101) and Text B (labeled 107). Within Text A (101) is a sequence of phrases (including phrases 102, 103, 104, 105, and 106) that are each represented by a bold letter "P." Within Text B (107) is a sequence of phrases (including phrases 108, 109, 110, 111, and 112) that are also each represented by a bold letter "P." A phrase is defined herein as a text string that includes one or more words, abbreviations, numbers, or combinations thereof. In this embodiment, phrases include capitalization and non-alphanumeric characters. For diagrammatic simplicity, Text A and Text B are shown as having only a small number of phrases. In practice, there might be hundreds or thousands of phrases in each body of text.

Figure 1:
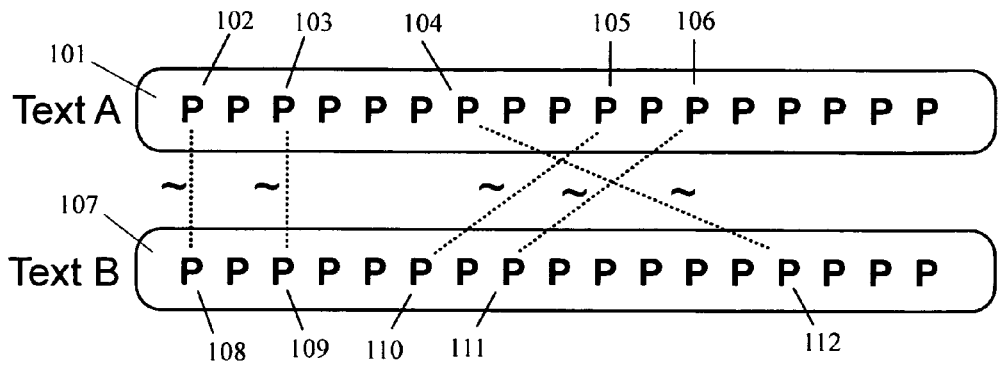
FIGS. 1 and 2 show a conceptual diagram of one embodiment of stage one of the multi-stage method of text morphing specified herein.
Figure 2:
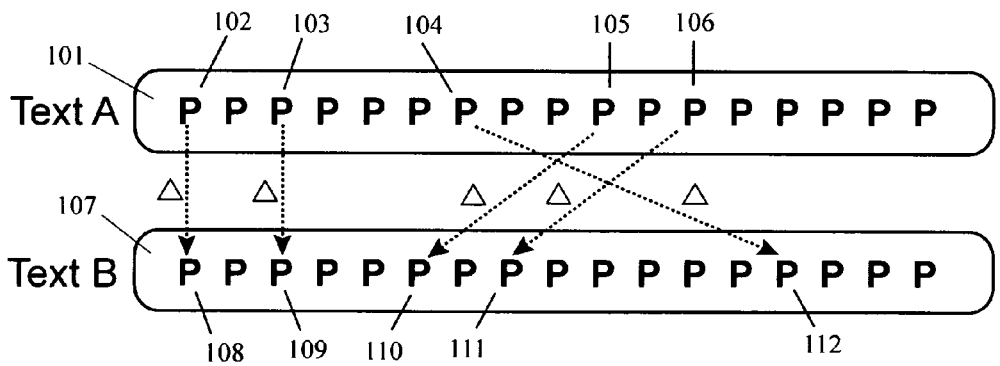

An explanation of the arrows linking phrases is given in the symbol key at the bottom of the page with FIGS. 1 and 2. This key shows that the "~" symbol indicates that linked phrases are identical or synonyms. A phrase synonym is one phrase that can be substituted for another phrase in use in text, in the direction of the arrow, without creating significant changes in the meaning of the text or creating grammatical errors in the text. The "Δ" symbol indicates substitution, in the direction of the arrow, of one phrase for another phrase.

In an example, one way to identify phrases that are synonyms is by using a database of phrase synonyms. There are several databases of synonyms in the prior art, including those integrated into common word processing software and publically-available datasets created by university researchers. There are also several methods in the prior art for creating databases of phrase synonyms. In light of this prior art, and since the particular method for selection or creation of a database of synonyms is not central to this invention, a particular database is not specified herein.

Phrase synonyms may be clustered into sets. A set of phrase synonyms may be bidirectionally substitutable—meaning that any phrase within the set can be substituted for any other phrase in the set, without creating significant changes in meaning or grammatical errors. Alternatively, a set of phrase synonyms may be only unidirectionally substitutable—meaning that there is at least one phrase in the set for which all other phrases in the set may be substituted, without creating significant changes in meaning or grammatical errors. For example, substitution of an acronym for a multi-word phrase is unidirectional if the acronym can stand for different multi-word combinations. Either bidirectional or unidirectional sets of phrase synonyms may be used in this method, as long as proper directionality of phrase substitution is maintained when unidirectional substitutions are done.

FIG. 1 shows the first step of stage-one text morphing in this embodiment. In this embodiment, stage-one text morphing begins with the identification of pairs of phrases that each includes Phrase A from Text A and Phrase B from Text B, wherein Phrase A is a synonym that can be substituted for Phrase B, in Text B. In this example, the following are pairs of phrase synonyms that each includes one phrase from Text A and one phrase from Text B—102 and 108; 103 and 109; 104 and 112; 105 and 110; and 106 and 111.

FIG. 2 shows the next step of stage-one text morphing in this embodiment. This next step involves, within each identified pair of phrase synonyms, substituting the Phrase A for Phrase B, in Text B. In this example, phrase 102 from Text A is substituted for phrase 108 in Text B, phrase 103 from Text A is substituted for phrase 109 in Text B, phrase 104 in Text A is substituted for phrase 112 in Text B, phrase 105 in Text A is substituted for phrase 110 in Text B, and phrase 106 is substituted for phrase 111 in Text B.

Stage-one morphs text style from Text A into Text B, but it does not significantly change the meaning of Text A. In this respect, stage-one text morphing is relatively non-intrusive. One could stop text morphing after stage-one without continuing to advanced stages. An advantage of stopping after stage-one morphing is that this largely preserves the logic, meaning, and grammar of Text A. However, stopping after stage-one does not significantly morph together the content of texts A and B. Thus, it does not generate novel concepts that can spark human imagination and invention. This limitation is why the method described herein is a multi-stage method that includes, at a minimum, a second stage of text morphing after this first stage.

In this embodiment of the invention, text content is morphed unidirectionally, from Text A into Text B. The labels "A" and "B" are arbitrary and can be reversed, so text content could be morphed unidirectionally from Text B into Text A, as long as one switches the labels "A" and "B" throughout the specification and claims. In a substantively different example, text can be morphed bidirectionally by switching phrases in both directions, not just one, as long as the synonym substitutions that are made are bidirectional synonym pairs. Text can be morphed from Text B into Text A at the same time that text is morphed from Text A into Text B. Such bidirectional text morphing creates two morphed texts, one that starts with Text A and morphs toward Text B, and one that starts with Text B or morphs toward Text A. In a third example of morphing directionality, the direction of substitution between A and B can be randomized across phrase pairs.

Figure 3:
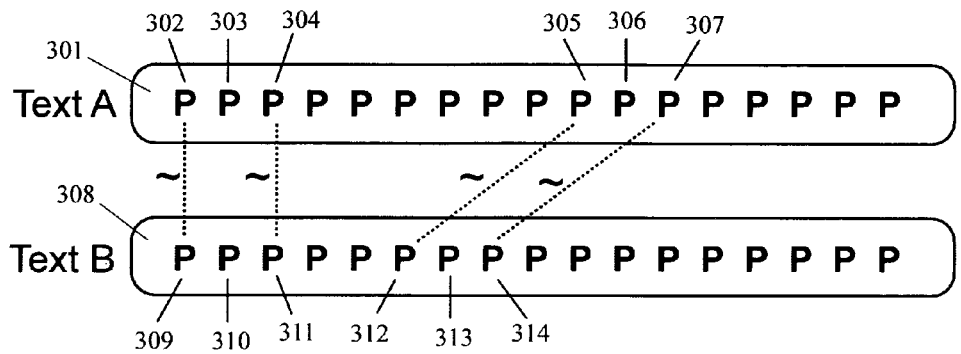
Figure 4:
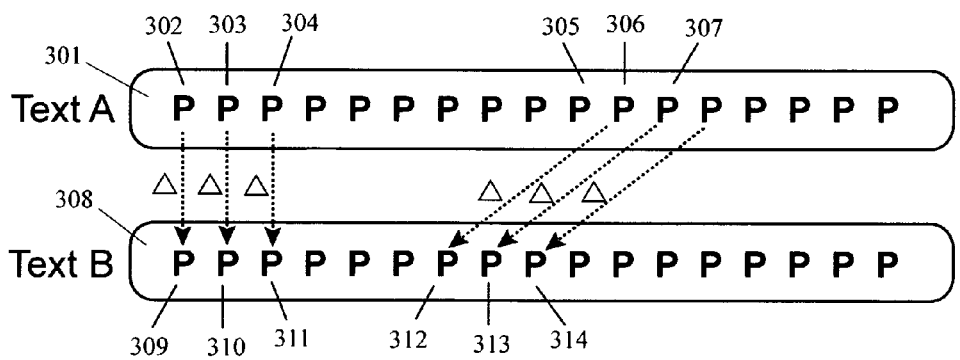

FIGS. 3 and 4 show a conceptual diagram of stage-two text morphing between Text A and Text B in this embodiment of the method. FIG. 3 shows identification of pairs of text segments. Each pair includes Segment A from Text A and Segment B from Text B. Also, Segment A and. Segment B each start with phrases that are synonyms of each other and end with phrases that are synonyms of each other. For example, phrases 302 and 309 are synonyms, and phrases 304 and 311 are synonyms. Thus, the segment in Text A formed by phrases 302, 303 and 304 and the segment in Text B formed by phrases 309, 310, and 311 are a pair of text segments that qualifies as a pair of segments for stage-two morphing. Another such pair is the combination of the segment in Text A formed by phrases 305, 306, and 307 and the segment in Text B formed by phrases 312, 313, and 314.

FIG. 4 shows the next step in stage-two text morphing. Within each pair of text segments identified, all or part of the segment in Text A is substituted for all or part of the segment in Text B, in Text B. In this example, the entire segment in A is substituted for the entire segment in B in Text B. In another example, only the middle phrase could be substituted. In other examples, the starting and middle phrases may be substituted, or the middle and ending phrases may be substituted.

It is important to note that in stage-two morphing, although the end portions of these pairs of text segments are synonyms, their middle portions are not. For example, phrase 303 in Text A is not a synonym of phrase 310 in Text B. Similarly, phrase 306 in Text A is not synonym of phrase 313 in Text B. Thus, substituting such segments in stage two changes the meaning, not just the writing style, of a body of text.

In some respects, stage-two morphing is analogous to genetic engineering that involves splicing and substituting gene sequences in which the end-portions of different gene segments are compatible for linking, but their middle portions are different. In genetic engineering, different gene segments with compatible end portions are spliced and substituted to create new organisms. A new organism created in this manner may, or may not, be functional and useful. In second-stage text morphing, different text segments with compatible end portions are spliced and substituted to create new concepts and expressions. A new concept or expression created in this manner may, or may not, be logical and useful. Although there is no guarantee that either genetic engineering or text morphing will yield useful results each time that it is used, both processes are powerful tools for creating new things when guided by human intuition and interacted with human imagination.

In some respects, morphing text is also analogous to morphing images. The identification of text segments with synonymous starting and end points in second-stage morphing is analogous, in some respects, to the identification of common structural points when morphing two or more images together.

Since second-stage text morphing involves the substitution of phrases that are not synonyms, it is transformational than the first stage. It morphs text meaning as well as writing style. On the downside, this can create narrative that is grammatically correct, but have sections that are absurd or illogical. If you morph a picture of a face with a picture of a car, then the resulting morphed picture may have elements that are absurd or illogical. Faces do not have windshields. Cars do not have eyes. However, on the upside, even absurd or illogical elements can inspire something useful or entertaining. Perhaps a morphed image of a face and a car might inspire you to design a car with lights that look like eyes? Perhaps you might be inspired to create a car with cameras that recognize approaching objects and warn the driver to avoid collisions? Perhaps you might be inspired to create an air-pressure-based "windshield" for the face that protects the wearer from exposure to germs without the need to cover the nose with a mask? Similar inspiration can come from morphing text context.

When morphing text, as when morphing images, morphing things that are similar is more likely to produce a logical and coherent synthesis than morphing things that are very different, but morphing dissimilar things is more likely to produce novel, thought-provoking, and/or entertaining results. The ability to controllably morph two bodies of text with multi-stage text morphing can create a novel combination, integration, or synthesis of Texts A and B that may prompt human imagination toward useful narrative, concepts, or products. The degree of transformation in second-stage text morphing depends on several factors including: the sizes of Text A and Text B; the degree of content and style similarity between Text A, Text B; and the size and relevance of any database of phrase synonyms used to the contents of Text A and Text B.

FIGS. 5 through 8 show an embodiment of stage-three text morphing. Stage-three morphing is similar to stage-two morphing in that both involve substitution of phrases that are dissimilar (e.g. not synonyms), but which are surrounded by context that is similar (e.g. having prior phrases that are synonyms and having following phrases that are synonyms). However, stage-three adds a large reference body of text, Text C, for identification of a larger number phrase pairs for substitution between Text A and Text B.

Figure 5:
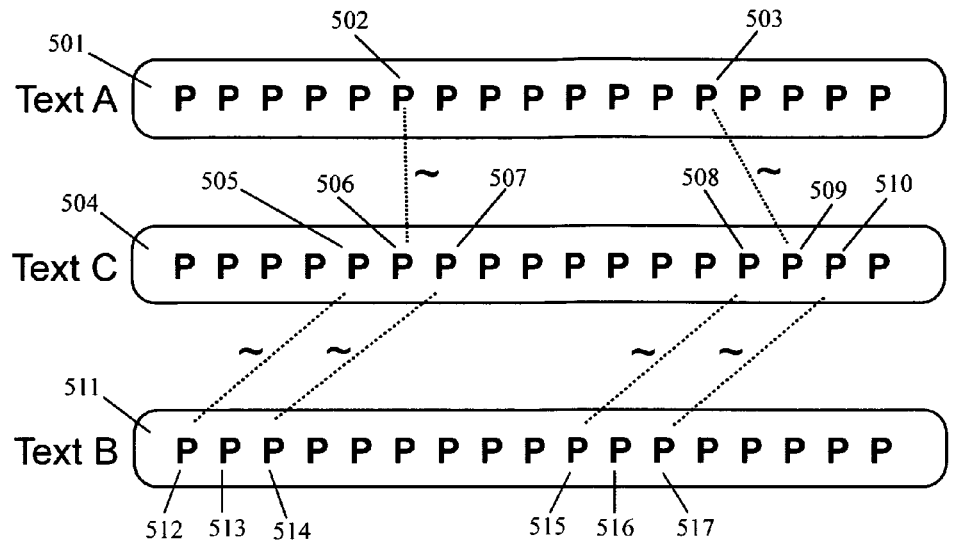
Figure 6:
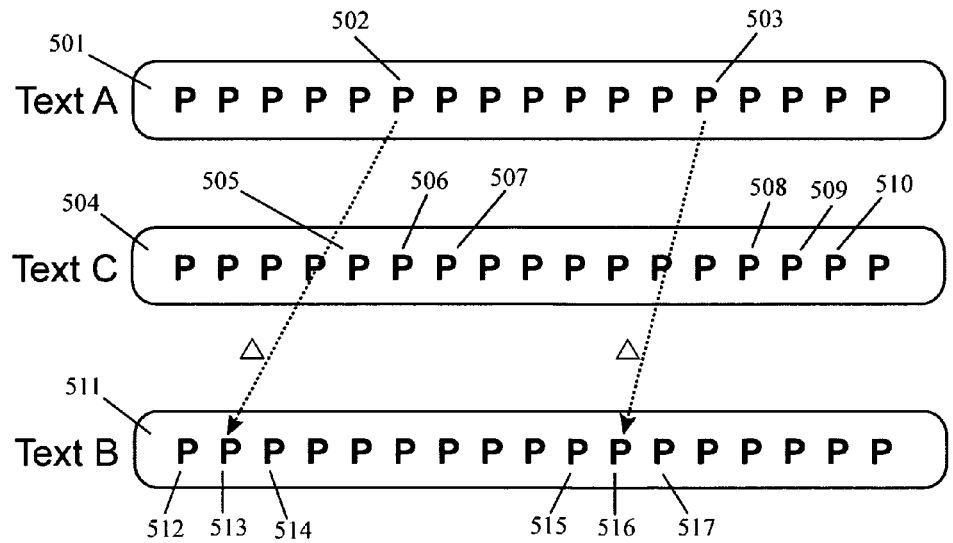
Figure 7:
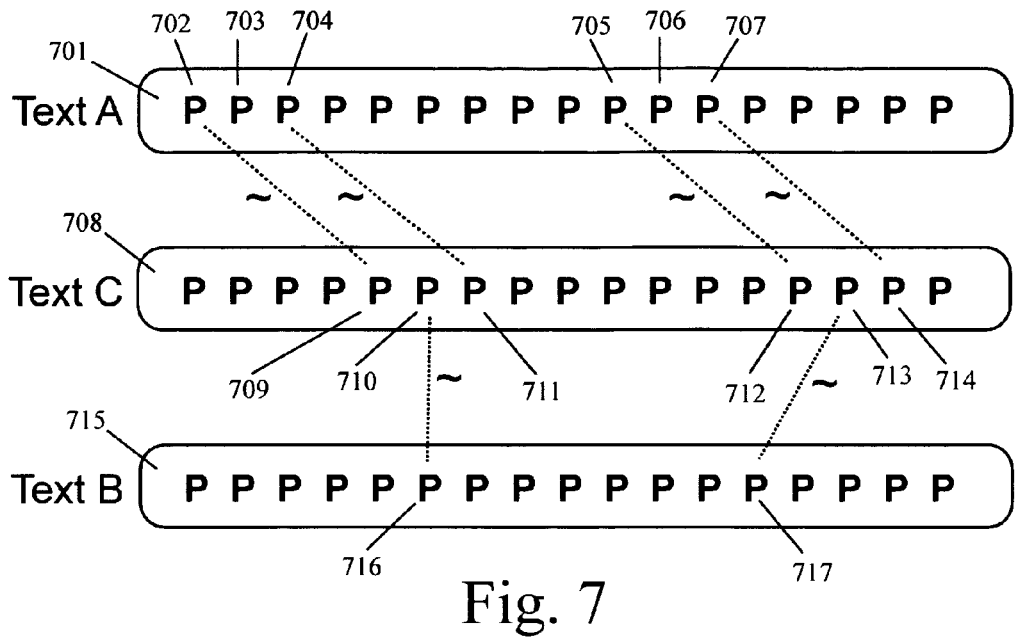
Figure 8:
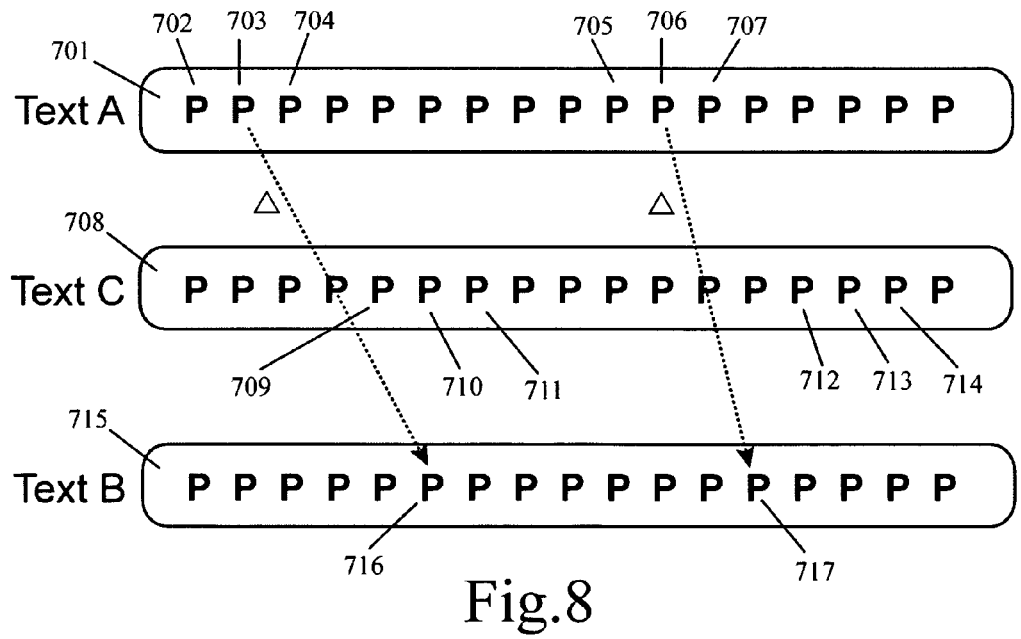

FIGS. 5 and 6 provide conceptual diagrams of one way to do stage-three text morphing and FIGS. 7 and 8 provide conceptual diagrams of a second way to do stage-three text morphing. These two ways may be done as alternatives or in combination. Stage-three text morphing involves using a larger reference body of text, which can be labeled Text C, to identify phrase substitutions between Text A and Text B. Similar to prior figures, FIG. 5 shows Text A (503) and Text B (511) whose contents are to be morphed together. However, FIG. 5 introduces the Text C (504) that serves as a reference to find additional promising substitutions between texts A and B.

For the sake of diagrammatic simplicity, FIG. 5 shows Text C with a sequence of relatively few phrases (including 505, 506, 507, 508, 509, and 510). In practice, Text C would likely have thousands, or even millions, of phrases. In this example, Text C is a single body of text. In another example, Text C could be a combination or collection of bodies of text. In an example, the database of phrase synonyms could be generic, not targeted to any particular body of text, style or writing, or subject matter. In another example, the database of synonyms could be created to specifically include the most common phrases in Text C.

FIG. 5 shows the identification of triplets of text that meet the following relational criteria. Each triplet of text has a phrase from Text A (such as 502), a segment from Text B (such as segment 512, 513, 514), and a segment from Text C (such as segment 505, 506, 507). Also, the segments in Text B and Text C each start with phrases (505 and 512) that are synonyms of each other and end with phrases (507 and 514) that are synonyms of each other. Finally, the middle portion of the segment in C (506) is a synonym for a phrase in A (502).

Two such triplets meeting these relational criteria are identified in FIG. 5 as part of stage-three text morphing. The first triplet includes: phrase 502 in Text A; the segment formed by phrases 512, 513, and 514 in Text B, and the segment formed by phrases 505, 506, and 507 in Text C. The second triplet includes: phrase 503 in Text A; the segment formed by phrases 508, 509, and 510 in Text B, and the segment formed by phrases 515, 516, and 517 in Text C. For diagrammatic simplicity, FIG. 5 shows only two such triplets. In practice, there may be hundreds or thousands of triplets meeting these relational criteria that span Texts A, B, and C.

FIG. 6 shows the next step in third-stage text morphing in this embodiment. In this step, within each triplet, the phrase in Text A is substituted for the middle portion of the text segment in Text B, in Text B. For example, within the first triplet, phrase 502 in Text A is substituted for phrase 513 in Text B. Within the second triplet, phrase 503 in Text A is substituted for phrase 516 in Text B.

In the embodiment shown in FIGS. 5 and 6, for each triplet, there is only one phrase substitution. Phrase 502 in Text A is substituted once for phrase 513 in Text B. Phrase 503 in Text A is substituted once for phrase 516 in Text B. However, within the scope of the method claimed herein, there can be various examples of whether, for each triplet: substitution is done only once in Text B; substitution is done repeatedly and uniformly throughout all of Text B; or substitution is done repeatedly and selectively throughout Text B.

For example, for each triplet, phrase substitution may be done only once and that one time is within the triplet. For example, phrase 502 is only substituted once for phrase 513. In another example, for each triplet, phrase substitution may be done repeatedly and uniformly throughout all of Text B. Phrase 502 may be substituted for any occurrence of phrase 513, or a synonym of 513, throughout Text B. In another example, for each triplet, phrase substitution may be done repeatedly and selectively throughout Text B. Phrase 503 may be substituted for occurrences of phrase 513, or a synonym for phrase 513, that meet certain additional criteria.

In considering these different examples of stage three of this multi-stage method, it should be kept in mind that substituting phrases into specified contexts (such as contexts in which the preceding and following phrases are more defined) will be less intrusive, but also less transformational, than substituting phrases into unspecified contexts (such as contexts in which the preceding and following phrases are less defined). It is a trade-off. The embodiment shown in FIGS. 5 and 6, with substitution done only once per triplet, is the more-conservative, less-intrusive, and less transformational option.

FIGS. 7 and 8 show a second way in which stage-three text morphing can be done. This second way is very similar to the way shown in FIGS. 5 and 6, except that: segments with matching start and end synonyms are identified between Text A and Text C, instead of between Text B and Text C; and a middle portion of a text segment from A is substituted for a phrase in B. Since this second way provides a less-specified content for substitution into Text B, it is slightly less-conservative, more-intrusive, and more transformational that the first way shown in FIGS. 5 and 6. This second way involves substitution a stand-alone phrase into Text B, without synonyms providing context before or after the phrase. This may not preserve proper grammar as well as first-stage morphing, second-stage morphing, or the first way of third-stage morphing. In different examples, third-stage morphing may be done only in the first way, only in the second way, or in both ways.

FIG. 7 shows identification of triplets of text: that each have a segment from Text A (such as segment 702, 703, 704), a phrase from Text B (such as phrase 716), and a segment from Text C (such as segment 709, 710, 711); wherein the segments in Text A and Text C start with phrases (702 and 709) that are synonyms of each other and end with phrases (704 and 711) that are synonyms of each other; and wherein the middle portion of the segment in C (710) is a synonym for a phrase in B (716). Two such triplets, each spanning texts A, C, and B, are identified in FIG. 7.

FIG. 8 shows the next step in this second way of third-stage text morphing. In this next step, for each triplet, the middle section of the segment in Text A is substituted for the phrase in Text B, in Text B. For example, in the first triplet, phrase 703 in Text A is substituted for phrase 716 in Text B. In the second triplet, phrase 706 in Text A is substituted for phrase 717 in Text B. In this embodiment, for each triplet, there is only one phrase substitution. However, within the scope of the method claimed herein, there can be different examples with respect to whether, for each triplet: substitution is done only once in Text B; substitution is done repeatedly and uniformly throughout all of Text B; or substitution is done repeatedly and selectively throughout Text B.

Figure 9:
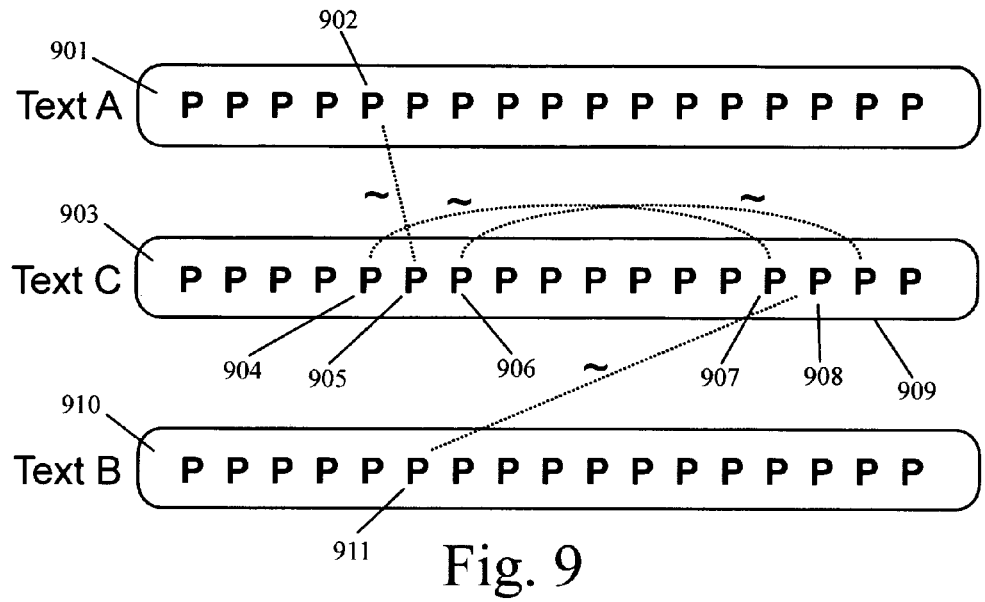
Figure 10:
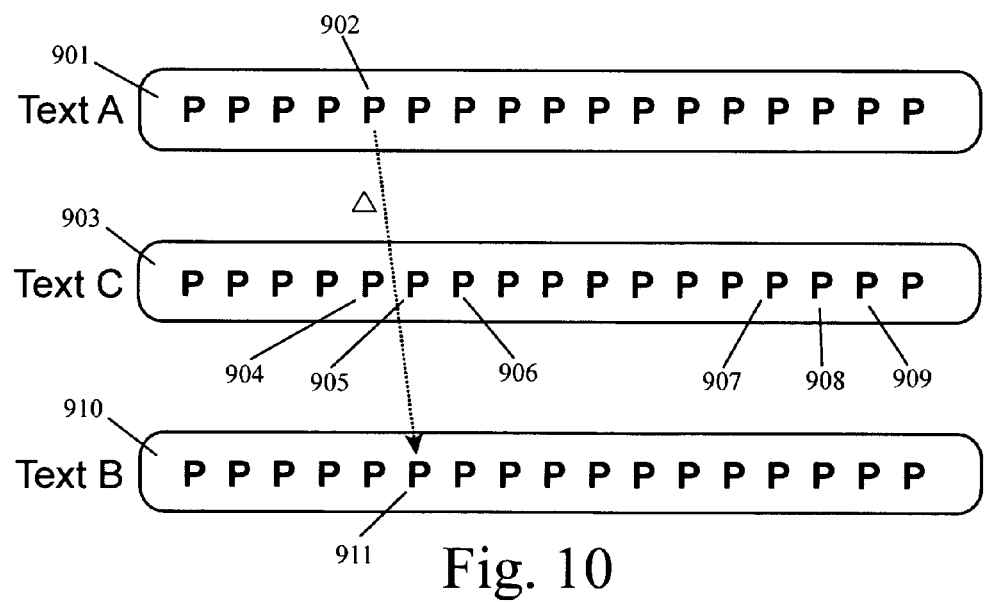

FIGS. 9 and 10 show an embodiment of stage-four text morphing. Stage-four morphing is similar to stage-three morphing in that both involve: substitution of phrases that are dissimilar (eg. not synonyms) but which are surrounded by similar context (eg. having prior phrases that are synonyms and having following phrases that are synonyms); and using a large reference body of text, Text C, for identification of a larger number phrase pairs for substitution. However, in stage-four, there is no longer the requirement that a similar context must be identified in Text A and Text C, or in Text C and Text B. In stage-four morphing, similar context can be identified in two segments that are both within Text C. Since Text C is generally very large compared to Texts A and B, stage-four increases the number of phrase substitutions. Stage-four morphing takes morphing further along the continuum toward more-intrusive and more-transforming changes.

FIG. 9 shows an embodiment of the first step of stage-four morphing. This first step involves identification of text quadruplets that meet the following criteria. Each text quadruplet must: have a phrase (Phrase A) from Text A, a phrase (Phrase B) from Text B, and two segments (Segment C1 and Segment C2) from Text C, wherein Segment C1 and Segment C2 start with phrases that are synonyms of each other and end with phrases that are synonyms of each other, wherein the segment portion between the starting and ending phrases of Segment C1 can be called Middle C1 and the segment portion between the starting and ending phrases of Segment C2 can be called Middle C2, and wherein Middle C1 is a synonym of, or identical to, Phrase A and wherein Middle C2 is a synonym of, or identical to, Phrase B.

There is only one quadruplet identified in FIG. 9 as meeting these criteria. This quadruplet includes: phrase 902 from Text A; phrase 911 in Text B, the segment formed by phrases 904, 905, and 906 in Text C; and the segment formed by phrases 907, 908, and 909 in Text C. Phrase 904 is a synonym of phrase 907. Phrase 906 is a synonym of phrase 909. This provides the common context for dissimilar phrases 905 and 908. All of these connections are made within Text C. Phrase 902 in Text A is a synonym for phrase 905 in Text C and phrase 911 in Text B is a synonym for phrase 908 in Text C. For diagrammatic simplicity, there is only one quadruplet identified in FIGS. 9 and 10. In practice, there could be hundreds or thousands of such quadruplets.

FIG. 10 shows the next step in stage-four morphing. In FIG. 10, for each text quadruplet (only one in this case), Phrase A (902) is substituted for Phrase B (911) in Text B. In this embodiment, for each text quadruplet, there is only one phrase substitution. However, within the scope of the method claimed herein, there can be different examples with respect to whether, for each quadruplet: substitution is done only once in Text B; substitution is done repeatedly and uniformly throughout all of Text B; or substitution is done repeatedly and selectively throughout Text B.

FIGS. 1 through 10 show conceptual diagrams for embodiments of four stages of a multi-stage process of text morphing. In various examples, the multi-stage morphing process could: stop after stages one and two; stop after stages one, two, and three; stop after stages one, two, three, and four; or add additional stages after stage four. For example, one could create a user interface in which the user enters, inputs, or uploads Text A and Text B to be morphed together and then selects how many stages of morphing are to be performed. Scalable control of the degree of text morphing, adjustable by the user, is a useful advantage of the multi-stage morphing process specified by this application. In another example, a user interface could create and display progressively-morphed documents, for the user to view, after each stage in the multi-stage text morphing process.

In another example of this method, one could repeat through one or more stages or stage sequences until selected process or outcomes criteria are met. For example, one could cycle repeatedly through all four stages until a selected percentage of the words in Text B have been changed. Morphing toward a defined percentage such as this is analogous, in some respects, to selecting a percentage blend when morphing two images together. In another example of this method, it is possible to change the order of the morphing stages, but generally it makes the most sense to start with the least intrusive and transformational stage (stage one) and then progress along the continuum to the most intrusive and transformational stage (stage four).

This method for multi-stage text morphing can also be used to enhance text-based search engines. Traditionally, text-based search engines respond to a search query by separately evaluating, ranking, and displaying individual sources based on their individual relevance to the search query. For example, a search engine may separately rank a large number of individual sources for relevance to a search query and then display the top ten individual sources on the first page of results.

However, there may be two complementary sources (A and B) that are not ranked high enough to appear on the first page when each is evaluated individually, but which provide the best answer to the search query when their contents are combined. Sources A and B combined provide a more comprehensive answer to the search query than any combination of the sources that appear on the first page of the traditional source engine. The traditional search engine, only evaluating and ranking sources individually, is blind to this. However, an integrative search engine, one that evaluates and ranks combinations of sources, can recognize this and inform the user, of which source combinations are the best. The missing piece for an integrative search engine is a method to combine text sources for combined analysis for relevance to a query. The method for multi-stage text morphing disclosed herein can be this missing piece.

Figure 11:
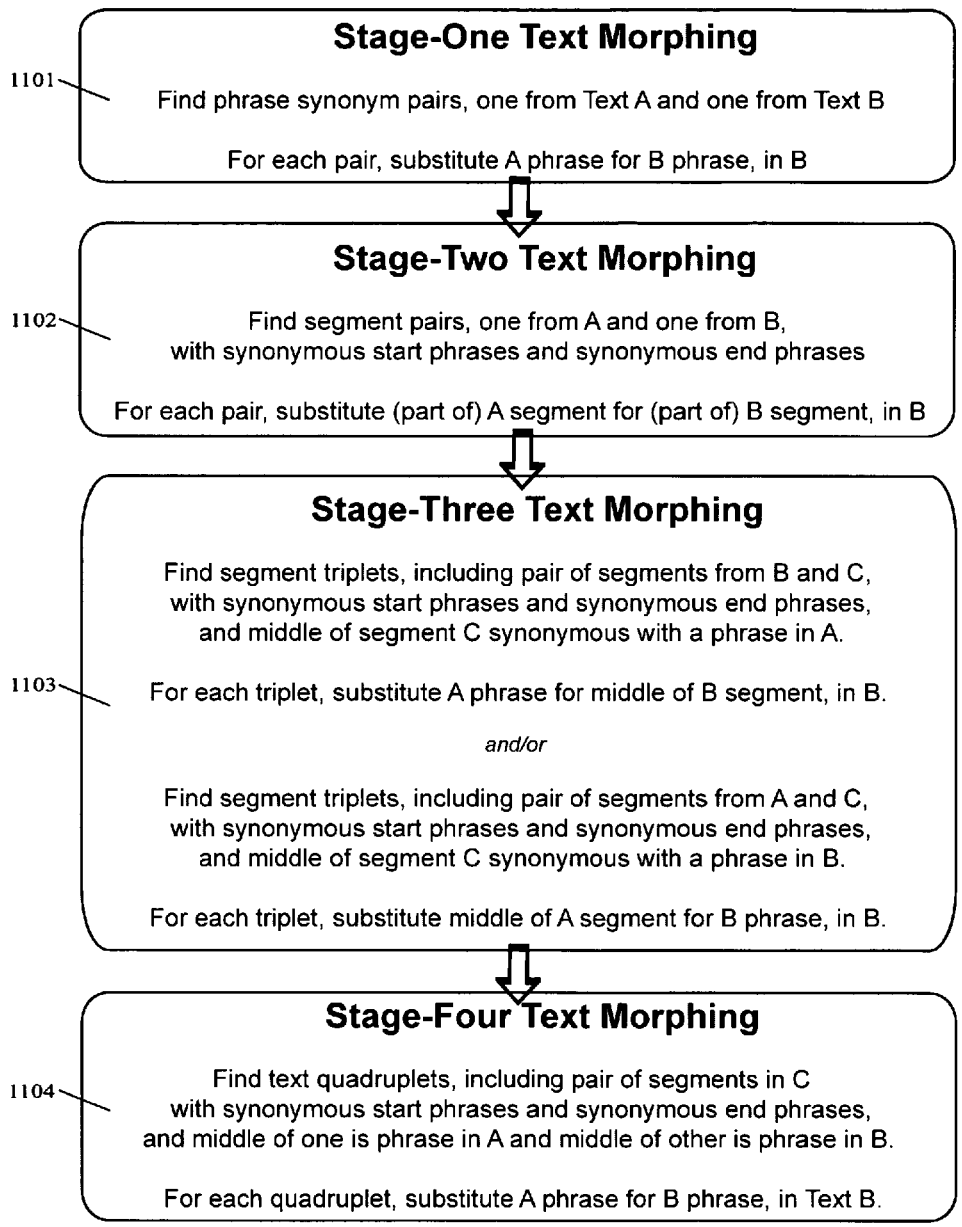

FIG. 11 shows a flow diagram that summarizes all four stages of text morphing. In stage-one text morphing (1101) one: finds phrase synonym pairs, one from Text A and one from Text B; and, for each pair, substitutes the A phrase for the B phrase, in B. In stage-two text morphing (1102) one: finds segment pairs, one from A and one from B, with synonymous start phrases and synonymous end phrases; and for each pair, substitutes (part of) the A segment for (part of) the B segment, in B.

FIG. 11 also shows that in stage-three text morphing (1103) one: finds segment triplets, including a pair of segments from B and C with synonymous start phrases and synonymous end phrases, and a middle of segment C that is synonymous with a phrase in A, and, for each triplet, substitutes the A phrase for the middle of the B segment, in B. Alternatively or additionally, in stage-three text morphing one: finds segment triplets, including a pair of segments from A and C with synonymous start phrases and synonymous end phrases, and a middle of segment C that is synonymous with a phrase in B, and, for each triplet, substitutes the middle of the A segment for the B phrase, in B.

Finally, FIG. 11 shows stage-four text morphing (1104) in which one: finds text quadruplets, including a pair of segments in C with synonymous start phrases and synonymous end phrases, wherein the middle of one segment is a phrase in A and the middle of the other segment is a phrase in B; and then, for each quadruplet, substitutes the A phrase for the B phrase, in Text B.

I claim:

1. A multi-stage method for morphing together bodies of text comprising:

stage-one text morphing within a computerized data processing environment, search engine, and/or user interface, wherein this stage-one text morphing comprises:
identifying pairs of phrases that each have a phrase (Phrase A) from a first body of text (Text A) and a phrase (Phrase B) from a second body of text (Text B); wherein a phrase is a text string containing one or more words, abbreviations, numbers, or combinations thereof; wherein Phrase A can be used as a phrase synonym for Phrase B; and wherein a phrase synonym is one phrase that can be substituted for another phrase in text use without causing significant changes in the meaning of the text or creating grammatical errors; and then substituting, within each pair of phrases, Phrase A for Phrase B, in Text B;
and stage-two text morphing within a computerized data processing environment, search engine, and/or user interface, wherein this stage-two text morphing comprises:
identifying pairs of text segments that each have a segment (Segment A) from Text A and a segment (Segment B) from Text B, wherein Segment A and Segment B start with phrase synonyms and end with phrase synonyms; and then substituting, within each pair of text segments, all or part of Segment A for all or part of Segment B, in Text B.

2. The multi-stage method for text morphing in claim 1 wherein a database of phrase synonyms is created with sets of phrases that are: bi-directionally substitutable, with any phrase in the set being substitutable for any other phrase in the set, without causing significant changes in meaning or grammatical errors; or uni-directionally substitutable, with any phrase in the set being substitutable for at least one phrase in the set, without causing significant changes in meaning or grammatical errors, and only substitutions in the proper direction are made in the multi-stage method for text morphing in claim 1.

3. The multi-stage method for text morphing in claim 1: wherein each phrase or segment substitution identified is performed only once in Text B; wherein each substitution identified is done as often as the phrase or segment to be replaced appears throughout all of Text B; or wherein each substitution identified is done selectively and non-uniformly, based on some ranking criteria, throughout Text B.

4. The multi-stage method for text morphing in claim 1 wherein multiple iterations of some or all morphing stages continue until process or outcomes criteria are met.

5. The multi-stage method for text morphing in claim 1 wherein the order in which two or more morphing stages are performed is changed.

6. The multi-stage method for text morphing in claim 1 wherein the result of the multi-stage text morphing process is evaluated for relevance to a query as part of an integrative information search process that evaluates the relevance of combinations of information sources to a query, instead of just evaluating the relevance of information sources individually.

7. A multi-stage method for morphing together bodies of text comprising:
stage-one text morphing within a computerized data processing environment, search engine, and/or user interface, wherein this stage-one text morphing comprises:
identifying pairs of phrases that each have a phrase (Phrase A) from a first body of text (Text A) and a phrase (Phrase B) from a second body of text (Text B); wherein a phrase is a text string containing one or more words, abbreviations, numbers, or combinations thereof; wherein Phrase A can be used as a phrase synonym for Phrase B; and wherein a phrase synonym is one phrase that can be substituted for another phrase in text use without causing significant changes in the meaning of the text or creating grammatical errors; and then substituting, within each pair of phrases, Phrase A for Phrase B, in Text B;
stage-two text morphing within a computerized data processing environment, search engine, and/or user interface, wherein this stage-two text morphing comprises:
identifying pairs of text segments that each have a segment (Segment A) from Text A and a segment (Segment B) from Text B, wherein Segment A and Segment B start with phrase synonyms and end with phrase synonyms; and then substituting, within each pair of text segments, all or part of Segment A for all or part of Segment B, in Text B;
and stage-three text morphing within a computerized data processing environment, search engine, and/or user interface, wherein this stage-three text morphing comprises:
identifying triplets of text that each have a phrase (Phrase A) from Text A, a segment (Segment B) from Text B, and a segment (Segment C) from a large reference body of text (Text C), wherein Segment B and Segment C start with phrase synonyms and end with phrase synonyms; wherein the segment portion between the starting and ending phrases of Segment B can be called Middle B and the segment portion between the starting and ending phrases of Segment C can be called Middle C, wherein Middle C is a synonym of, or identical to, Phrase A; and substituting, for each triplet, Phrase A for Middle B, in Text B; and/or
identifying triplets of text that each have a segment (Segment A) from Text A, a phrase (Phrase B) from Text B, and a segment (Segment C) from a large reference body of text (Text C), wherein Segment A and Segment C start with phrase synonyms and end with phrase synonyms; wherein the segment portion between the starting and ending phrases of Segment A can be called Middle A and the segment portion between the starting and ending phrases of Segment C can be called Middle C, wherein Middle C is a synonym of, or identical to, Phrase B; and substituting, for each triplet, Middle A for Phrase B, in Text B.

8. The multi-stage method for text morphing in claim 7 wherein a database of phrase synonyms is created with sets of phrases that are: bi-directionally substitutable, with any phrase in the set being substitutable for any other phrase in the set, without causing significant changes in meaning or grammatical errors; or uni-directionally substitutable, with any phrase in the set being substitutable for at least one phrase in the set, without causing significant changes in meaning or grammatical errors, and only substitutions in the proper direction are made in the multi-stage method for text morphing in claim 7.

9. The multi-stage method for text morphing in claim 7: wherein each phrase or segment substitution identified is performed only once in Text B; wherein each substitution identified is done as often as the phrase or segment to be replaced appears throughout all of Text B; or wherein each substitution identified is done selectively and non-uniformly, based on some ranking criteria, throughout Text B.

10. The multi-stage method for text morphing in claim 7 wherein multiple iterations of some or all morphing stages continue until process or outcomes criteria are met.

11. The multi-stage method for text morphing in claim 7 wherein the order in which two or more morphing stages are performed is changed.

12. The multi-stage method for text morphing in claim 7 wherein the result of the multi-stage text morphing process is evaluated for relevance to a query as part of an integrative information search process that evaluates the relevance of combinations of information sources to a query, instead of just evaluating the relevance of information sources individually.

13. A multi-stage method for morphing together bodies of text comprising:

stage-one text morphing within a computerized data processing environment, search engine, and/or user interface, wherein this stage-one text morphing comprises:
identifying pairs of phrases that each have a phrase (Phrase A) from a first body of text (Text A) and a phrase (Phrase B) from a second body of text (Text B); wherein a phrase is a text string containing one or more words, abbreviations, numbers, or combinations thereof; wherein Phrase A can be used as a phrase synonym for Phrase B; and wherein a phrase synonym is one phrase that can be substituted for another phrase in text use without causing significant changes in the meaning of the text or creating grammatical errors; and then substituting, within each pair of phrases, Phrase A for Phrase B, in Text B;

stage-two text morphing within a computerized data processing environment, search engine, and/or user interface, wherein this stage-two text morphing comprises:
identifying pairs of text segments that each have a segment (Segment A) from Text A and a segment (Segment B) from Text B, wherein Segment A and Segment B start with phrase synonyms and end with phrase synonyms; and then substituting, within each pair of text segments, all or part of Segment A for all or part of Segment B, in Text B;

stage-three text morphing within a computerized data processing environment, search engine, and/or user interface, wherein this stage-three text morphing comprises:
identifying triplets of text that each have a phrase (Phrase A) from Text A, a segment (Segment B) from Text B, and a segment (Segment C) from a large reference body of text (Text C), wherein Segment B and Segment C start with phrase synonyms and end with phrase synonyms; wherein the segment portion between the starting and ending phrases of Segment B can be called Middle B and the segment portion between the starting and ending phrases of Segment C can be called Middle C, wherein Middle C is a synonym of, or identical to, Phrase A; and substituting, for each triplet, Phrase A for Middle B, in Text B; and/or
identifying triplets of text that each have a segment (Segment A) from Text A, a phrase (Phrase B) from Text B, and a segment (Segment C) from a large reference body of text (Text C), wherein Segment A and Segment C start with phrase synonyms and end with phrase synonyms; wherein the segment portion between the starting and ending phrases of Segment A can be called Middle A and the segment portion between the starting and ending phrases of Segment C can be called Middle C, wherein Middle C is a synonym of, or identical to, Phrase B; and substituting, for each triplet, Middle A for Phrase B, in Text B;

and stage-four text morphing within a computerized data processing environment, search engine, and/or user interface, wherein this stage-four text morphing comprises:
identifying quadruplets of text that each have a phrase (Phrase A) from Text A, a phrase (Phrase B) from Text B, and two segments (Segment C1 and Segment C2) from Text C, wherein Segment C1 and Segment C2 start with phrase synonyms and end with phrase synonyms; wherein the segment portion between the starting and ending phrases of Segment C1 can be called Middle C1 and the segment portion between the starting and ending phrases of Segment C2 can be called Middle C2, wherein Middle C1 is a synonym of, or identical to, Phrase A and wherein Middle C2 is a synonym of, or identical to, Phrase B; and substituting, for each quadruplet, Phrase A for Phrase B, in Text B.

14. The multi-stage method for text morphing in claim 13 wherein a database of phrase synonyms is created with sets of phrases that are: bi-directionally substitutable, with any phrase in the set being substitutable for any other phrase in the set, without causing significant changes in meaning or grammatical errors; or uni-directionally substitutable, with any phrase in the set being substitutable for at least one phrase in the set, without causing significant changes in meaning or grammatical errors, and only substitutions in the proper direction are made in the multi-stage method for text morphing in claim 13.

15. The multi-stage method for text morphing in claim 13: wherein each phrase or segment substitution identified is performed only once in Text B; wherein each substitution identified is done as often as the phrase or segment to be replaced appears throughout all of Text B; or wherein each substitution identified is done selectively and non-uniformly, based on some ranking criteria, throughout Text B.

16. The multi-stage method for text morphing in claim 13 wherein multiple iterations of some or all morphing stages continue until process or outcomes criteria are met.

17. The multi-stage method for text morphing in claim 13 wherein the order in which two or more morphing stages are performed is changed.

18. The multi-stage method for text morphing in claim 13 wherein the result of the multi-stage text morphing process is evaluated for relevance to a query as part of an integrative information search process that evaluates the relevance of combinations of information sources to a query, instead of just evaluating the relevance of information sources individually.

* * * * *